April 23, 1957 R. W. FRITTS ET AL 2,790,021

THERMOELECTRIC GENERATOR

Filed Nov. 24, 1953

INVENTORS
Robert W. Fritts
Sebastian Karrer
By Brown, Jackson, Boettcher & Dienner
attorneys United States Patent Office 2,790,021

Patented Apr. 23, 1957

2,790,021

THERMOELECTRIC GENERATOR

Robert W. Fritts, Elm Grove, Wis., and Sebastian Karrer, Port Republic, Md., assignors to Milwaukee Gas Specialty Company, Milwaukee, Wis., a corporation of Wisconsin Application November 24, 1953, Serial No. 394,074

12 Claims. (Cl. 136—4)

This invention relates to thermoelectric generators, and more particularly, thermocouples wherein at least one element is of a semi-metallic alloy. A "semi-metallic alloy," as the term is used throughout this specification and in the appended claims, is to be understood as meaning an alloy having lower mechanical strength than that ordinarily exhibited by metal, and whose composition is chemically reactive, especially at elevated temperatures, requiring isolation from substances having deleterious affinity therefor. Such alloys are further characterized by having high thermoelectric power with respect to a metal, low resistivity (the temperature coefficient of which is positive) and low thermal conductivity with respect to a metal. Examples of such "semi-metallic alloys" are certain lead and tellurium, lead and selenium, and lead and selenium-tellurium alloys. Other examples of "semi-metallic alloys" are the zinc-antimony alloys described in U. S. Patents Nos. 2,229,482 and 2,366,881 to Telkes, the copper-silver-selenium alloys described in U. S. Patent No. 2,232,960 to Milnes, the copper-silver-tellurium-selenium-sulphur alloys described in U. S. Patent No. 2,397,756 to Schwarz, and the silver-tellurium alloys described in U. S. Patent No. 2,602,095 to Faus.

Utilization of the semi-metallic alloys aforeindicated as elements of thermocouples presents problems not ordinarily encountered in the use, for example, of metallic thermocouple elements, which problems result from the characteristic physical and chemical differences between metallic elements and the semi-metallic elements aforementioned. Utilization of such elements as thermocouple elements of necessity subjects the element to high temperatures and to large temperature changes, which would quickly destroy such elements if treated in the same manner as metallic elements, since at elevated temperatures semi-metallic elements of the type under consideration oxidize rapidly and suffer undesired changes of electrical properties. Moreover, the mechanical strength of such semi-metallic elements is such that they are able to withstand only small tensile or shearing stresses, although mild compressive loads can be supported indefinitely. Accordingly, compensation for any mismatch in the thermal expansion and contraction as between the semi-metallic thermoelectric element and the second thermoelectric element of the thermoelectric generator must be provided.

The foregoing mechanical and chemical limitations impose stringent requirements for any mounting of such semi-metallic elements that are intended to extract thermal energy from a source of heat for an extended period of time.

Accordingly, among the objects of the present invention are the provision of mountings and thermocouple assemblies for thermocouple elements of semi-metallic alloys of the type aforeindicated which afford the following:

1. Disposition of the element in an inert atmosphere and hermetic sealing of the element from oxygen and other deleterious gases for the lifetime of the unit.

2. Isolation of the element from any external shock or mechanical forces.

3. Provision for freedom of one end of the element to move for displacement relative to other parts of the assembly to relieve any compressive or tensile stresses arising from a differential expansion or contraction of the element with respect to other parts of the assembly during heating and/or cooling.

4. Efficient heat transfer through the assembly and particularly the electrical connections comprising the hot and cold junctions thereof to afford maximum conversion efficiency.

5. Provision of means for cooling the cold junctions of the assemblies to afford high conversion efficiency.

Another object of the invention is to provide a thermocouple assembly affording the aforementioned characteristics, and more specifically providing hermetic sealing of the inner thermocouple element enabling the assembly to be utilized for high temperature applications.

Another object of the invention is to provide a thermocouple assembly of the aforementioned character affording higher conversion efficiencies by virtue of novel means for maintaining a high differential in temperature between the hot and cold junctions of the thermocouple.

Another and more specific object of the invention is to provide a thermocouple assembly of the aforementioned character wherein means affording hermetic sealing of the unit is disposed remotely from the high temperature zone, thereby eliminating necessity for sealing means adapted to high temperatures.

Other objects and advantages will hereinafter appear or become apparent from the following description, it being understood that the embodiment of the drawings is illustrative only.

Figure 1:
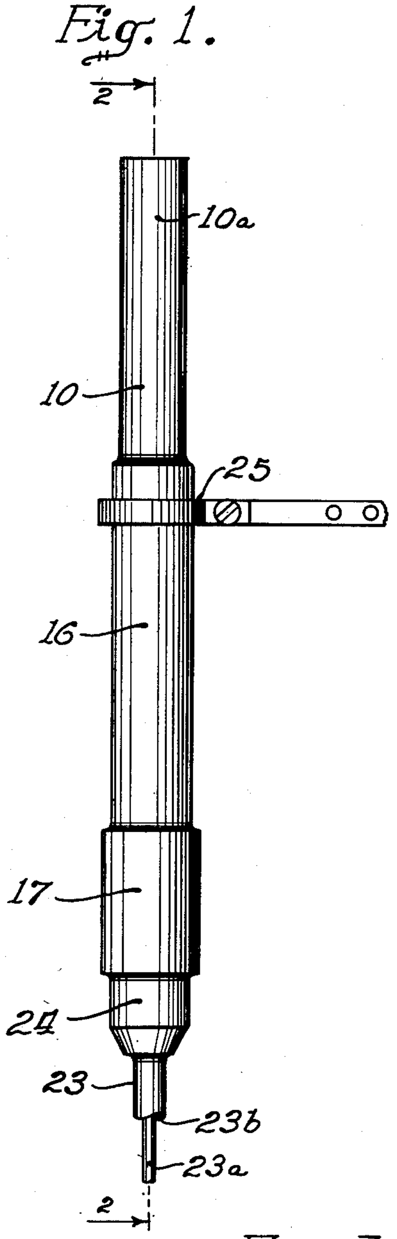
Figure 1 is an elevational view of one form of thermoelectric generator assembly constructed in accordance with the teachings of the present invention.
Figure 2:
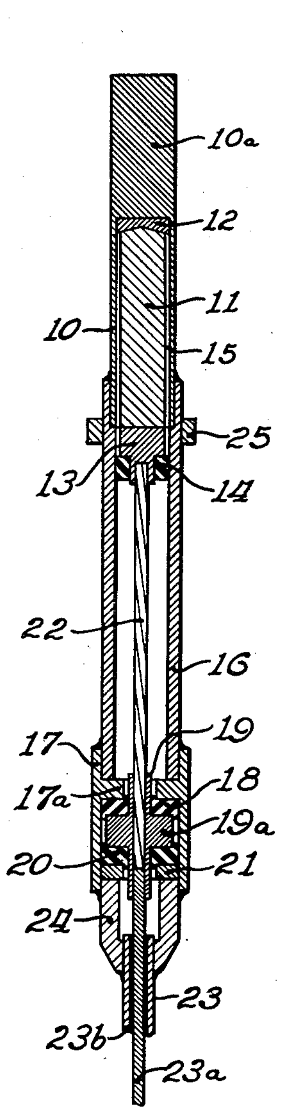
Figure 2 is a sectional view taken on the line 2—2 of Figure 1.
Figure 3:
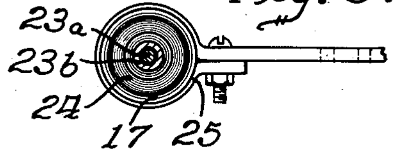
Figure 3 is an end elevational view of the assembly illustrated in Figures 1 and 2.

Referring to the drawings, particularly Figures 1 and 2 thereof, we have shown a thermoelectric generator, comprising a pair of thermocouple element means 10 and 11. The thermocouple element means 10 in the illustrated embodiment of our invention comprises a generally cup-shaped member, preferably of stainless steel, having a hollow tubular sleeve or sheath portion **10*b*, which serves as the outer element of the assembly, and a tip portion 10*a* which, as shown, may be conveniently formed integrally at one end of the sleeve or sheath portion, hermetically sealing or closing the latter at that end, and serving as a heat probe element means for the assembly. The thermocouple element means 10 and 11 are mechanically and electrically joined at one end only as through a contact electrode 12, to be hereinafter described, to provide a hot junction for the thermocouple. Where the thermocouple element means 10 is of stainless steel or of an iron alloy the contact electrode 12 may, if desired, be formed as an integral part of the element 10 in which case the element 11 is joined thereto by the fusion method of contacting hereinafter referred to. The element 11 in the assembly aforedescribed is the negative element of the couple, while the stainless steel sheath 10 serves both to enclose the element 11 and the hot junction, as well as to function as the positive member of the couple when the couple is heated at the hot junction. The thermal voltages developed in the elements 10 and 11 are of opposite sign (relative to plantinum) with respect to the temperature gradient and hence are additive in a series circuit formed between a cold junction electrode 13** and the cold end of the sheath. The voltage developed in the sheath is small by comparison to that of the element 11, wherefore the latter, conveniently for purposes of this specification, is denominated the "active" element.

The "active" element 11 may, as aforementioned, be, for example, of a lead and selenium-tellurium alloy. Such an element comprises lead and selenium-tellurium constituents melted together at from about 1688 degrees Fahrenheit to 1953 degrees Fahrenheit, depending upon the proportions of selenium and tellurium constituents, preferably in a reducing atmosphere and cast into the desired shape, after which it is preferably annealed at from 1200 degrees Fahrenheit to 1500 degrees Fahrenheit for from ten to twenty hours. The element 11 is further to be understood, in this instance, as consisting of lead and selenium-tellurium constituents, the selenium-tellurium constituent varying linearly in percent by weight of the element with the atomic proportions of selenium and tellurium in said selenium-tellurium constituent, the selenium-tellurium constituent ranging from a minimum of 25 percent and a maximum of 27.55 percent when tellurium is but a trace in selenium, to a minimum of 35 percent and a maximum of 38.05 percent when selenium is but a trace in tellurium, the balance of the element in each instance being substantially all lead. The element 11 aforementioned is also, in this instance, to be understood as containing metallic impurity not exceeding the order of 0.01 percent and to be substantially oxygen free. Further details with respect to the composition of element 11 may be found in the copending application of Sebastian Karrer, Serial No. 392,648, now abondoned, filed November 17, 1953, and the whole of which is disclosed in continuation-in-part application, Serial No. 475,540, filed December 15, 1954.

Elements of the character aforedescribed, as previously pointed out, have particular utility as an element for thermo-electric conversion of heat to electrical energy. For example, an element in which the lead constituent is 63 percent by weight, remainder substantially all tellurium with but a trace of selenium, exhibits a thermoelectric power of −270 microvolts per degree centigrade against copper, and a resistivity of .001 ohm-cm. at room temperature.

From the foregoing it may be observed that the assembly described may be characterized as the combination of a semi-metallic inner element and a stainless steel outer element forming a thermocouple that exhibits the high conversion efficiency of the semi-metallic alloy, and simultaneously, the mechanical strength and chemical inertness of the stainless steel element, provided, of course, the element 11 is hermetically sealed and mounted, as will hereinafter be more fully described.

Mechanical and electrical contact between the outer element or sheath 10 and the active element 11 at the hot junction, and electrical connection at the cold junction end of the element 11, is made over a substantial area through contact electrodes 12 and 13, respectively. Such contact electrodes provide contacts of low thermal and electric resistance, and are chemically stable with respect to the active element 11. Iron is especially adapted for such contact electrodes with the lead and selenium-tellurium active element 11 aforedescribed. These contact electrodes may be of the type more fully described in the copending application of Russell E. Fredrick, Robert W. Fritts and William V. Huck, Serial No. 366,238, now abandoned, filed July 6, 1953, and the whole of which is disclosed in continuation-in-part application, Serial No. 475,539, filed December 15, 1954.

Such contact electrodes 12 and 13, may be of either a pressure or bonded type. In the latter case the element-electrode interface should have a mechanical strength at least comparable to that of the semi-metallic alloy of the element 11. More specifically, the contact electrodes 12 and 13 may be bonded to the active element 11 by either the "direct casting" or "fusion" method, more fully hereinafter described. If the "direct casting" method is utilized, the iron of the electrode is preferably stabilized in the alpha phase by addition of one or more of known alpha-phase stabilizers. A preferred stabilizer for this purpose is, however, molybdenum in amount of from 2.7 percent to 7 percent by weight of the iron.

If the "fusion" method of contacting the element 11 is utilized, the iron of the electrode may be stabilized in the gamma phase, alpha phase, or unstabilized. Whether the "direct casting" or "fusion" method is utilized, it is important, however, that iron diffuse into the active element 11 during the contacting procedure in amount no more than 0.5 percent by weight of the element lest the thermoelectric power and electrical resistivity of the element 11 be reduced more than 10 percent.

As aforementioned, the thermocouple element means 10 and 11 are joined to form an electrical connection at the hot junction only, the element 11 being spaced throughout the remainder of its length from the sheath 10. An annular bushing 14 of electrical insulating material surrounds the cold junction electrode 13 and loosely engages the sheath extension 16, which is secured to the open end of sheath 10 and forms part of the thermocouple element means 10, and to support the free end of the element 11 and to center it with respect to the sheath 10 and sheath extension member 16. The space between element 11 and sheath 10 with its extension 16, best illustrated at 15 in Figure 2, serves to insulate electrically the elements from each other, and is preferably filled with an inert atmosphere to prevent oxidation of the active element 11.

Sealing means are provided to seal the space 15 from ambient atmosphere, which means, as shown in Figure 2, primarily comprises a collar 17, preferably of brass, brazed or otherwise attached to the open end of the sheath extension 16 providing the assembly an outer cold junction. The collar 17 has an inturned flange 17*a* against which a sealing gasket or washer 18 of pliable material, such as silicone rubber, is adapted to be pressed in sealing engagement. The seal further comprises an annular core member 19 having a medial flange 19*a*, one side of which is adapted to sealingly engage the gasket 18 aforementioned, and the other side of which is adapted to sealingly engage a second gasket 20, similar to gasket 18, both gaskets 18 and 20 being of electrically non-conductive material. As best shown in Figure 2, the core member 19 is of diameter slightly less than that of the collar 17, and floats therein, as will hereinafter become apparent. Since as aforementioned, its only connection with the collar 17 is through the electrically insulating gaskets 18 and 20, it is electrically isolated from the collar 17 for reasons which will hereinafter appear. An annular seal retaining ring 21 completes the seal assembly, said ring being adapted to be pressed into the collar 17 to sealingly engage the outer surface of the gasket 20 and to place both gaskets 18 and 20 under a slight compression to provide a hermetical seal between the parts aforedescribed. Electrical connection between the cold junction electrode 13 and seal core member 19 is made through a flexible connector, such as wire 22, preferably of braided copper, for low thermal and electrical resistance, the ends of which are soldered to the cold junction electrode 13 and seal core 19 respectively, it being understood, of course, that the joinder of wire 22 and seal core 19 is a hermetically sealed joint.

The aforedescribed thermoelectric generator assembly may be conveniently placed in an external circuit utilizing a coaxial lead 23 of the general type disclosed in the patent to O. J. Leins, No. 2,126,564, issued August 9, 1938. The inner lead 23*a* of such a coaxial lead may be soldered or otherwise connected to the seal core 19, as shown in Figure 2, while the outer lead 23*b* is electrically connected to the collar 17 by means of an annular cup-shaped bracket member 24, suitably connected mechanically and electrically between said collar 17 and the outer lead 23*b*, as also best shown in Figure 2.

As will be apparent, any differential thermal expansion as between the sheath 10 and active element 11 will be taken up in the flexible connector 22, wherefor the hermetic sealing means aforedescribed may be a static seal. It will also be observed that the flexible connector 22 constitutes a means for isolating the contact electrode 13 and hence active element 11 from external forces which might be applied to lead 23.

Thus, a sealing means is afforded for the thermocouple assembly which hermetically seals the element 11 from ambient atmosphere and deleterious gases, and since it is removed from the heated portion of the assembly permits the generator to be operated at very high temperatures without danger of damage to the seal.

The whole assembly aforedescribed is preferably of cylindrical symmetry to facilitate assembly of the several parts, and the integrally formed cup-shaped case 10 is preferred to avoid any influx of oxygen that might take place through a weld, which might be imperfect, located in the hot zone.

Since, as is well known in the art, the electrical and thermal resistance of the unit are dependent upon the configuration thereof, as well as the electrical and thermal conductivities of the elements 10 and 11, a relationship between the dimensions of each element can be obtained which affords the highest thermal conversion efficiency in such a mounting or assembly. In the embodiment described the thermal conductivity of the active element 11 is low as compared to that of the outer element 10 (for example .02 w./cm./°C. as compared to .261 w./cm./°C.).

For elements of any given thermal and electrical conductivities the conversion efficiency depends strongly on the ratio of thickness of the sheath 10 to radius of the element 11 or more specifically upon the ratio of the cross sectional area of the two elements. In the embodiment illustrated, this ratio of the radius of the element 11 to the thickness of the sheath 10 is preferably about 6 to 1 or more.

It is understood, of course, that the conversion efficiency of the thermocouple is also dependent upon the difference between the hot and cold junction temperatures. For thermocouples utilizing a semi-metallic inner element, having a low thermal conductivity, high temperature differences can be achieved by selection for the semi-metallic element a ratio of length to diameter, which in the exemplary embodiment herein disclosed is about 4 to 1, such that radiation transfer of heat from the surface of the inner element to the outer sheath establishes substantial temperature gradients within the inner element, particularly near the hot junction. When this is done the heat flux into the inner element through the hot junction is exhausted to the case over the entire surface of the inner element allowing the cold end of the semi-metallic element, or inner cold junction, to assume a temperature only slightly greater than that of the outer cold junction. A further consequence of such radiation cooling is the reduced electrical resistance of the semi-metallic inner element having a positive temperature coefficient of resistance.

The radiation responsible for the removal of the heat transmitted across the hot junction takes place between the active element 11, its cold junction electrode 13, and the metal walls of the sheath 10 and its extension 16. Since the cold junction temperature under such circumstances is dependent upon the temperature of its environment, it is, therefore, desirable to keep the ambient temperatures low. The extension of the case to a cooler zone, as by extension 16, provides a heat sink which aids in cooling the casing around the cold junction, in addition to simplifying the sealing means necessary by virtue of the remoteness of the latter from the high temperature zone. Additionally, heat may be withdrawn from the external cold junction by virtue of a mounting bracket 25 clamped around the sheath extension member 16 where such mounting brackets is attached to a supporting member (not shown) of lower temperatures. It is to be understood that radiation from the sheath 10 to the environment likewise aids in removing the heat flowing through the outer metallic sheath member.

The method of assembling the thermocouple units aforedescribed is as follows:

The active element 11 is first assembled to the contact electrode 13 by either the "direct casting" or "fusion" method. In the "direct casting" method alpha-stabilized iron is placed in a mold, preferably of graphite, and the semi-metallic alloy aforementioned in chunk or granular form is also placed therein in contiguous engagement with the iron. The mold is then heated, preferably in a reducing atmosphere, to the melting point of the semi-metallic alloy; that is, within the temperature range of 1700 degrees Fahrenheit to 2000 degrees Fahrenheit, for a short interval of time to produce limited alloying between the iron and the semi-metallic alloy. The mold is then cooled causing the molten semi-metallic alloy to solidify as an ingot firmly bonded to the iron electrode.

Alternatively, as indicated, a semi-metallic element 11, preformed, as aforedescribed, may be bonded to the contact electrode 13 of iron by the "fusion" method. This method comprises heating the iron of the contact electrode to a temperature of 1350 degrees Fahrenheit to 1660 degrees Fahrenheit to permit migration of the iron into the semi-metallic element to form a thin layer of an alloy thereof having a melting point below the phase transformation temperature of the iron, and immediately fusing said layer and the electrode to provide the bond between the element and the electrode. In this method the iron need not be alpha-stabilized, but may be unstabilized or even gamma-phase stabilized.

The subassembly aforedescribed is then preferably annealed at from about 1050 degrees Fahrenheit to 1250 degrees Fahrenheit for from ten to twenty hours in an inert or reducing atmosphere to render the composition more homogeneous after which the flexible connector 22 and bushing 14 are affixed thereto.

The annealed subassembly is then inserted into the open end of the sheath member 10 to which the sheath extension 16 has previously been attached, and to the bottom of which has been butt welded the contact electrode 12 (if not integral with the member 10 as aforedescribed), forming the hot junction electrode, as shown in Figure 2. After insertion of the active element into the sheath 10, as aforementioned, the tapered end of the element 11 may then be fused to the contact electrode 12 by the "fusion" method aforedescribed, it being understood that this step is taken under a reducing atmosphere.

Next the collar 17 is suitably attached to the opposite end of the sheath extension 16, and the connector wire 22 is inserted in the seal core 19 as the latter is inserted in the collar 17 with the gaskets 18 and 20 in the positions indicated. Then the seal retaining ring 21 is pressed into place and the seal is completed by soldering the connector 22 to the seal core 19. Finally the lead connections are made as aforementioned.

With completion of the assembly of the thermocouple unit aforedescribed, the unit is now ready to be connected to an external circuit and placed in operation.

We claim:

1. A thermoelectric generator comprising, a first semi-metallic alloy thermocouple element means, a second thermocouple element means connected to said first thermocouple element means to provide a hot junction, cold junction means for said first thermocouple element means, sealing means remote from said cold junction means for shielding said first thermocouple element means from ambient atmosphere, electrical connection means extending from said cold junction means through said sealing means in sealed relation thereto, and means mounted on said second thermocouple element means at the portion thereof adjacent said cold junction means for effecting heat transfer thereat.

2. An incapsulated thermoelectric generator comprising, hollow outer thermocouple element means, an inner semi-metallic thermocouple element means of low thermal conductivity, disposed within and connected to the latter to afford a hot junction, the ratio of the radius of said inner thermocouple element means with respect to the wall thickness of said outer thermocouple element means being in excess of 6 to 1, and said inner and outer thermocouple element means being of lengths substantially in excess of the width of said inner thermocouple element means to afford cooling of said inner thermocouple element means by radiation.

3. The thermoelectric generator of claim 13 characterized by the provision of extension means having connection with said outer thermocouple element means to afford a heat sink for the latter.

4. Sealing means for shielding from ambient atmosphere a semi-metallic alloy thermocouple element means disposed within an elongated outer metallic thermocouple element sleeve means having an opening at one end thereof, in which the semi-metallic alloy thermocouple element means is connected to said metallic thermocouple element means to provide a hot junction, and in which the semi-metallic alloy thermocouple element is provided with cold junction means remotely inwardly of the opening in the metallic thermocouple element means comprising, an electrically conductive core member disposed in insulated and sealed relation in said outer thermocouple element means at the opening in the latter, a flexible electrical connector extending between said cold junction means and said core member, and electrical connections to said core member and said outer thermocouple element means.

5. Sealing means for shielding from ambient atmosphere a semi-metallic alloy thermocouple element means disposed within an elongated outer metallic thermocouple element sleeve means having an opening at one end thereof, in which the semi-metallic alloy thermocouple element means is connected to said metallic thermocouple element means to provide a hot junction, and in which the semi-metallic alloy thermocouple element is provided with cold junction means remotely inwardly of the opening in the metallic thermocouple element means comprising, a collar attached to said outer thermocouple sleeve means at the opening thereof, an electrically conductive core member, a pair of gaskets of insulating material disposed at opposite ends of said core member, for mounting the same in insulated sealed relation in said collar, a flexible electrical connector between said cold junction means and said core member, and external circuit connections to said outer thermocouple sleeve means and said core member.

6. A hermetically sealed thermoelectric unit which comprises a thermoelectric element to be protected from the surrounding atmosphere, a casing with said thermoelectric element housed therein, said thermoelectric element being connected at a portion thereof to said casing to provide a hot junction, said casing being provided with an opening, means to electrically insulate the remaining portion of said thermoelectric element to prevent electrical shorting of the same against the casing, cold junction means for said thermoelectric unit, a sealing member under compression within the casing at the opening of said casing, a terminal of said thermoelectric element extending through said sealing member to the exterior of the casing, means to retain said sealing member under compression within said casing whereby said opening remains hermetically sealed, and means mounted on said casing at the portion thereof adjacent said cold junction means for effecting heat transfer thereat.

7. A hermetically sealed thermoelectric unit which comprises a first thermoelectric element to be protected from the surrounding atmosphere, a casing forming a second thermoelectric element and having said first thermoelectric element housed therein, said first thermoelectric element being connected at a portion thereof to said casing to provide a hot junction, said casing being provided with an opening, means to electrically insulate the remaining portion of said first thermoelectric element to prevent electrical shorting of the same against the casing, cold junction means for said first thermoelectric element, a sealing member under compression within the casing at the opening of said casing, means to retain said sealing member under compression within said casing whereby said opening remains hermetically sealed, electrical connection means for said first thermoelectric element extending in sealed relation through said sealing member to the exterior of said casing, and electrical connection means for said casing.

8. A hermetically sealed thermoelectric unit comprising a semi-metallic thermoelectric element, a casing housing said semi-metallic thermoelectric element, hot junction means at a portion of said semi-metallic thermoelectric element, cold junction means disposed away from said hot junction means, sleeve means for said unit having one end thereof at said cold junction means and extending away therefrom to aid in dissipating heat from said cold junction means, sealing means for said sleeve for shielding said semi-metallic thermoelectric element from ambient atmosphere, and said sealing means being disposed at the other end of said sleeve means so that heat at said cold junction means is adapted to be substantially dissipated before reaching said sealing means.

9. A hermetically sealed thermoelectric unit comprising a semi-metallic thermoelectric element, a casing housing said first thermoelectric element, hot junction means at one end of said semi-metallic thermoelectric element, cold junction means against the other end of said semi-metallic thermoelectric element opposite said hot junction means, sleeve means connected at one end thereof to said casing at said cold junction means and extending away therefrom to aid in dissipating heat from said cold junction means, sealing means for said sleeve for shielding said semi-metallic thermoelectric element from ambient atmosphere, said sealing means being disposed at the other end of said sleeve means so that heat at said cold junction means is substantially dissipated before reaching said sealing means, and flexible electrical connector means extending from said cold junction means through said sleeve and in sealed relation through said sealing means to protect said semi-metallic thermoelectric element from external shock transmitted therethrough.

10. A hermetically sealed thermoelectric unit comprising a semi-metallic thermoelectric element, a casing forming a second thermoelectric element and housing said first thermoelectric element therein, said semi-metallic thermoelectric element being connected at one end thereof to said casing to provide a hot junction, cold junction means at the other end of said semi-metallic thermoelectric element, sleeve means connected at one end thereof to said casing at said cold junction means and extending away therefrom to aid in dissipating heat from said cold junction means, sealing means for said sleeve for shielding said semi-metallic thermoelectric element from ambient atmosphere, said sealing means being disposed at the other end of said sleeve means so that heat at said cold junction means is substantially dissipated before reaching said sealing means, flexible electrical connector means extending from said cold junction means through said sleeve and in sealed relation through said sealing means to protect said semi-metallic thermoelectric element from external shock transmitted therethrough, and electrical connection means for said casing.

11. A thermoelectric generator comprising, a pair of thermocouple element means, at least one of which is a semi-metallic alloy, and the other an enclosure for enclosing said first thermocouple element means, said pair of thermocouple element means being connected to provide a hot junction, cold junction means for said generator, the ratio of the radius of said semi-metallic thermocouple element means with respect to the wall thickness of said other thermocouple element means being in excess of 6 to 1, said semi-metallic thermocouple element means being greater in length than width and said other thermocouple element means being co-extensive with said semi-metallic thermocouple element means, said semi-metallic thermocouple element means being adapted to radiate heat to said other thermocouple element means, whereby the temperature differential between said hot and cold junctions is augmented.

12. A thermoelectric generator comprising, a pair of thermocouple element means, at least one of which is a semi-metallic alloy, and the other an enclosure for enclosing said first thermocouple element means, said pair of thermocouple element means being connected to provide a hot junction, the ratio of the radius of said semi-metallic thermocouple element means with respect to the wall thickness of said other thermocouple element means being in excess of 6 to 1, and the ratio of length to width of said semi-metallic thermocouple element means being of the order of 4 to 1, said other thermocouple element means being co-extensive with said semi-metallic thermocouple element means, cold junction means at the end of said thermocouple element means opposite said hot junction, and heat sink means including extension means for said other thermocouple element means extending away from said cold junction means for effecting cooling of the latter.

References Cited in the file of this patent

UNITED STATES PATENTS

| | | |
|---|---|---|
| 425,568 | Edelkamp | Apr. 15, 1890 |
| 461,437 | Iden | Oct. 20, 1891 |
| 511,245 | Mestern | Dec. 19, 1893 |
| 1,818,221 | Huber | Aug. 11, 1931 |
| 1,992,747 | Gilliland et al. | Feb. 26, 1935 |
| 2,126,564 | Leins | Aug. 9, 1938 |
| 2,229,481 | Telkes | Jan. 21, 1941 |
| 2,229,482 | Telkes | Jan. 21, 1941 |
| 2,232,960 | Milnes | Feb. 25, 1941 |
| 2,366,881 | Telkes | Jan. 9, 1945 |
| 2,397,756 | Schwarz | Apr. 2, 1946 |
| 2,602,095 | Faus | July 1, 1952 |

FOREIGN PATENTS

| | | |
|---|---|---|
| 154,454 | Great Britain | Dec. 2, 1920 |